US012791059B2

(12) United States Patent
Komatsubara et al.

(10) Patent No.: US 12,791,059 B2
(45) Date of Patent: Nov. 10, 2026

(54) FLUID DYNAMIC PRESSURE BEARING LUBRICANT OIL COMPOSITION, FLUID DYNAMIC PRESSURE BEARING, AND FLUID DYNAMIC PRESSURE BEARING APPARATUS

(71) Applicants: NTN CORPORATION, Osaka (JP); NOK KLUEBER CO., LTD., Tokyo (JP)

(72) Inventors: Shinji Komatsubara, Mie (JP); Dai Osanai, Ibaraki (JP)

(73) Assignees: NTN CORPORATION, Osaka (JP); NOK KLUEBER CO., LTD., Tokyo (JP)

( * ) Notice: Subject to any disclaimer, the term of this patent is extended or adjusted under 35 U.S.C. 154(b) by 0 days.

(21) Appl. No.: 18/872,477

(22) PCT Filed: Jun. 6, 2023

(86) PCT No.: PCT/JP2023/021062
§ 371 (c)(1),
(2) Date: Dec. 6, 2024

(87) PCT Pub. No.: WO2023/243496
PCT Pub. Date: Dec. 21, 2023

(65) Prior Publication Data

US 2025/0361908 A1 Nov. 27, 2025

(30) Foreign Application Priority Data

Jun. 14, 2022 (JP) ................................ 2022-095576
May 24, 2023 (JP) ................................ 2023-085666

(51) Int. Cl.
*F16C 33/10* (2006.01)

(52) U.S. Cl.
CPC ........ *F16C 33/1065* (2013.01); *F16C 33/104* (2013.01); *F16C 33/109* (2013.01)

(58) Field of Classification Search
CPC .. F16C 33/104; F16C 33/1065; F16C 33/109; F16C 2370/12
See application file for complete search history.

(56) References Cited

U.S. PATENT DOCUMENTS 9,920,274 B2 * 3/2018 Maruyama ........... C10M 133/12
2003/0153472 A1 8/2003 Nagano et al.
(Continued)

FOREIGN PATENT DOCUMENTS

CN 1428407 7/2003
CN 1748092 3/2006
(Continued)

OTHER PUBLICATIONS

International Preliminary Report on Patentability and Written Opinion of the International Searching Authority issued Dec. 10, 2024 in International (PCT) Patent Application No. PCT/JP2023/021062.
(Continued)

*Primary Examiner* — James Pilkington
(74) *Attorney, Agent, or Firm* — Wenderoth, Lind & Ponack, L.L.P.

(57) ABSTRACT

A lubricating-oil composition for a fluid-dynamic bearing, which is to be used for a fluid-dynamic bearing (8) including radial dynamic pressure generating portions (A1, A2) provided on an inner peripheral surface (Sa) of a porous body, has the following makeup. That is, a base oil having a kinematic viscosity of more than 30 $mm^2/s$ and 80 $mm^2/s$ or less at a temperature of 40° C. is used as a base oil of the lubricating-oil composition, and the makeup of the lubricating-oil composition is adjusted so that the lubricating-oil
(Continued)

composition has a kinematic viscosity of 90 $mm^2/s$ or more and 140 $mm^2/s$ or less at a temperature of 40° C.

8 Claims, 3 Drawing Sheets

(56) References Cited

U.S. PATENT DOCUMENTS

| | | | | |
|---|---|---|---|---|
| 2006/0257659 | A1* | 11/2006 | Hampden-Smith | B01J 2/006 252/301.36 |
| 2011/0057527 | A1 | 3/2011 | Mori et al. | |
| 2015/0233417 | A1 | 8/2015 | Komatsubara et al. | |
| 2016/0230769 | A1 | 8/2016 | Komatsubara | |
| 2019/0186532 | A1* | 6/2019 | Ito | B22F 1/17 |
| 2022/0333031 | A1* | 10/2022 | Sugiyama | F16C 33/109 |

FOREIGN PATENT DOCUMENTS

| | | |
|---|---|---|
| CN | 104641131 | 5/2015 |
| JP | 9-125086 | 5/1997 |
| JP | 2001-152174 | 6/2001 |
| JP | 2004-18597 | 1/2004 |
| JP | 2006-77119 | 3/2006 |
| JP | 3782889 | 6/2006 |
| JP | 2008-266377 | 11/2008 |
| JP | 2011-111463 | 6/2011 |
| JP | 2012-13167 | 1/2012 |
| JP | 2015-64019 | 4/2015 |
| WO | 2011/155513 | 12/2011 |

OTHER PUBLICATIONS

International Search Report (ISR) issued Aug. 8, 2023 in International (PCT) Application No. PCT/JP2023/021062.

* cited by examiner

FLUID DYNAMIC PRESSURE BEARING LUBRICANT OIL COMPOSITION, FLUID DYNAMIC PRESSURE BEARING, AND FLUID DYNAMIC PRESSURE BEARING APPARATUS

TECHNICAL FIELD

The present invention relates to a lubricating-oil composition for a fluid-dynamic bearing, a fluid-dynamic bearing, and a fluid-dynamic bearing device, and more particularly, to a lubricating-oil composition to be used for a fluid-dynamic bearing comprising a radial dynamic pressure generating portion.

BACKGROUND ART

A fluid-dynamic bearing is a bearing to be used under a state in which a lubricating oil (hereinafter referred to as "lubricating-oil composition" in this specification) is impregnated into inner pores of a porous body made of, for example, a sintered metal. The lubricating-oil composition impregnated into the inner pores seeps into a sliding portion with respect to a shaft portion, which is inserted along an inner periphery of the fluid-dynamic bearing, along with relative rotation of the shaft portion, to thereby form an oil film. The fluid-dynamic bearing is configured to rotationally support the shaft portion through this oil film. Such a bearing has excellent rotational accuracy and quietness, and hence has been suitably used as a bearing device for a motor to be mounted to various electrical apparatus such as information apparatus. More specifically, the fluid-dynamic bearing has been suitably used for a spindle motor to be used in an HDD or disc drives for a CD, a DVD, and a Blu-ray disc, for a fan motor to be built in the disc drives, a PC, or the like, or for a polygon scanner motor to be built in a laser beam printer (LBP).

Further, it has been known that, in order to achieve further improvement in quietness and prolongation of life, a dynamic pressure generating portion such as a dynamic pressure generating groove is formed in at least one of an inner peripheral surface or an axial end surface of the fluid-dynamic bearing. In this case, when the lubricating-oil composition impregnated into the inner pores of the fluid-dynamic bearing is allowed to seep into a gap between a region of the inner peripheral surface of the bearing, in which the dynamic pressure generating portion is formed, and an outer peripheral surface of the shaft portion, along with the rotation of the shaft portion (rotor) inserted along the inner periphery of the bearing, a dynamic pressure action is produced in the gap so that the shaft portion can be rotationally supported in a non-contact manner with respect to the bearing through the oil film of the lubricating-oil composition.

Incidentally, in recent years, along with downsizing and thinning of information apparatus, there have been demands for downsizing of various motors to be mounted to the information apparatus. For example, cooling fan motors to be used, for example, in laptop computers have been thinned, and hence the thinning of bearing devices to be used in those motors has also been required. Meanwhile, a level of required cooling performance is equal to or higher than those in the related art. Thinning the bearing device leads to a reduction in bearing area, and thus, when a size of an impeller (fan) is not only to be increased but also to be maintained, there is a higher risk of bringing about a reduction in rigidity of the bearing correspondingly to the reduction in area of the bearing.

In Patent Literature 1, there has been proposed a lubricating-oil composition suitable for a fluid-dynamic bearing including an inner peripheral surface on which dynamic pressure generating portions such as dynamic pressure generating grooves are formed. That is, in Patent Literature 1, there have been proposed a lubricating-oil composition containing one base oil selected from a compound of poly-α-olefin or a hydride thereof and an ester, and an ester, and a fluid-dynamic bearing impregnated with the lubricating-oil composition.

CITATION LIST

Patent Literature 1: JP 3782889 B2

SUMMARY OF INVENTION

Technical Problem

Incidentally, in recent years, cooling fan motors to be used in laptop computers or the like have been further thinned, and thus a further reduction in axial dimension of bearings to be used in the motors has also been required. Meanwhile, when the axial dimension of the bearing is reduced, an area on which a radial dynamic pressure generating portion can be formed is correspondingly reduced, and hence a dynamic pressure that can be generated in a radial bearing gap is also reduced. Thus, it becomes difficult to highly accurately support a rotator such as the impeller including a shaft portion, which may lead to a decrease in rotation accuracy (Non-Repeatable Run-Out (NRRO)). When the rotation accuracy is decreased as described above, and hence the amount of eccentricity of the shaft portion (rotator) is increased, the radial bearing gap is reduced. As a result, a risk of contact between the shaft portion and the bearing is disadvantageously increased.

In order to generate a sufficient dynamic pressure even with the radial bearing gap reduced due to the eccentricity of the shaft portion, it is conceivable to, for example, as described in Patent Literature 1, adjust makeup of the lubricating-oil composition to increase a viscosity of the lubricating-oil composition. However, when the viscosity of the lubricating-oil composition is simply increased, bearing torque is increased while the rigidity of the bearing is increased. Thus, there arises another problem in that power consumption of the motor is disadvantageously increased.

In view of the actual circumstances described above, a technical object to be achieved by the present invention is to provide a lubricating-oil composition for a fluid-dynamic bearing, which can provide a high load-carrying capacity as a bearing for small motors while preventing an increase in bearing torque.

Solution to Problem

The above-mentioned object is achieved by a lubricating-oil composition for a fluid-dynamic bearing according to the present invention. That is, the lubricating-oil composition is characterized by a lubricating-oil composition for a fluid-dynamic bearing, the lubricating-oil composition being configured to be used for a fluid-dynamic bearing, which is formed of a porous body having inner pores, and comprises a radial dynamic pressure generating portion on an inner peripheral surface of the porous body, wherein a base oil having a kinematic viscosity of more than 30 $mm^2/s$ and 80

$mm^2/s$ or less at a temperature of 40° C. is used as a base oil, and wherein the lubricating-oil composition has a kinematic viscosity of 90 $mm^2/s$ or more and 140 $mm^2/s$ or less at a temperature of 40° C. The "fluid-dynamic bearing" in this specification refers to a dynamic bearing other than a cylindrical bearing. Thus, the "radial dynamic pressure generating portion" in this specification refers to a portion having a shape other than a perfectly circular cylinder, which allows a dynamic pressure action of the lubricating-oil composition to be produced in a radial bearing gap between the radial dynamic pressure generating portion and a rotator such as a shaft portion.

The inventors of the present invention have found that, when eccentricity of the shaft portion is large, and the radial bearing gap is extremely small, it is difficult for a polymer-based viscosity index improver, which is often added to increase a viscosity of the lubricating-oil composition, to enter the radial bearing gap. The present invention has been made in view of the finding described above. A base oil having a kinematic viscosity of more than 30 $mm^2/s$ and 80 $mm^2/s$ or less at a temperature of 40° C. is used as the base oil, and makeup of the lubricating-oil composition is adjusted so that the lubricating-oil composition has a kinematic viscosity of 90 $mm^2/s$ or more and 140 $mm^2/s$ or less at a temperature of 40° C. A polymer-based viscosity index improver can be used to adjust the viscosity. However, when the amount of addition of the polymer-based viscosity index improver is excessively large, formation of an oil film becomes unstable. Thus, when the viscosity index improver is to be added, it is preferred that the amount of addition of the viscosity index improver be adjusted to 4 wt % or less. With the adjustment of the kinematic viscosities of the base oil and the lubricating-oil composition as described above, the oil film of the lubricating-oil composition can be formed in the radial bearing gap regardless of a size of the radial bearing gap. Thus, the fluid-dynamic bearing can have a high load-carrying capacity. Further, with the adjustment of the makeup of the lubricating-oil composition as described above, for example, addition of the viscosity index improver as little as possible, a viscosity at a low temperature at the time of start of activation can be prevented from being increased more than required. Thus, a required high load-carrying capacity can be stably achieved without increasing the bearing torque.

In the lubricating-oil composition for a fluid-dynamic bearing according to the present invention, the base oil may be a mixture of a non-polar oil and a polar oil, and a ratio of the non-polar oil to an entirety of the base oil may be 20 wt % or more and 30 wt % or less.

For evaluation of the load-carrying capacity (load capacity) of the fluid-dynamic bearing, there has been known a method using an electrical resistance method. According to this method, for example, an rpm of the shaft portion inserted along an inner periphery of the fluid-dynamic bearing is gradually changed under a state in which a predetermined load is being applied to the fluid-dynamic bearing. Based on the rpm at the time when contact between the shaft portion and the fluid-dynamic bearing is detected, the load-carrying capacity of the fluid-dynamic bearing is evaluated. In this case, when the base oil is a mixture of a non-polar oil and a polar oil, and a ratio of the non-polar oil is excessively small, a ratio of the polar oil having a relatively low electrical resistivity is correspondingly large. As a result, there is a higher risk of an erroneous determination that the shaft portion and the fluid-dynamic bearing have been brought into contact with each other through energization of the shaft portion and the fluid-dynamic bearing via a lubricating oil although the shaft portion and the fluid-dynamic bearing have not been actually brought into contact with each other. In other words, there is a higher risk that the load-carrying capacity may be evaluated to be lower than an actual load-carrying capacity. In this regard, when the ratio of the non-polar oil having a relatively high electrical resistivity is set to 20 wt % or more, an electrical resistivity of the entire lubricating-oil composition can be held down to such a degree that the energization of the shaft portion and the fluid-dynamic bearing via the lubricating-oil composition can be prevented as much as possible. Thus, an erroneous determination in an evaluation process for the load-carrying capacity based on the electrical resistance method can be prevented as much as possible to thereby enable appropriate evaluation of the load-carrying capacity of the fluid-dynamic bearing. Further, when the ratio of the non-polar oil is held down to 30 wt % or less, an increase in viscosity at a low temperature can be prevented, and hence, an increase in evaporation amount can be prevented.

Further, when the base oil is a mixture of a non-polar oil and a polar oil, the non-polar oil may be a synthetic hydrocarbon oil made from poly-α-olefin or a hydride thereof.

As described above, the use of the synthetic hydrocarbon oil made from poly-α-olefin (also referred to as "PAO") or a hydride thereof (also referred to as "PAOH") as the non-polar oil to be contained as a part of the base oil can broaden a temperature range of use for the lubricating-oil composition. Further, the fluid-dynamic bearing can be provided with desirable initial conformability together with excellent lubricity. Further, improvement in durability can be achieved.

Further, when the base oil is a mixture of a non-polar oil and a polar oil, the polar oil may be an ester oil.

As described above, the use of an ester oil as the polar oil to be contained as apart of the base oil can improve an evaporation characteristic, the lubricity, and abrasion resistance. In particular, when a synthetic hydrocarbon oil made from poly-α-olefin or a hydride thereof is used as the non-polar oil, the use of the ester oil as a polar oil composition allows a problem in solubility, which is a disadvantage of polyolefins, to be overcome. Further, with mixing of an ester oil with the synthetic hydrocarbon oil made from poly-α-olefin or a hydride thereof, desirable bearing performance of the fluid-dynamic bearing can be stably maintained over a long period of time. The reason for this is considered that the mixed ester oil suppresses generation of foam from poly-α-olefin, or, even when foam is generated, allows the foam to disappear quickly.

In the lubricating-oil composition for a fluid-dynamic bearing as described above, the fluid-dynamic bearing may be provided as a fluid-dynamic bearing obtained through impregnation of the inner pores with the lubricating-oil composition. Further, in this case, in the fluid-dynamic bearing according to the present invention, a dynamic pressure generating groove array region may be formed as the radial dynamic pressure generating portion on the inner peripheral surface.

With the formation of the dynamic pressure generating groove array region as described above, a dynamic pressure action of the lubricating-oil composition can be effectively produced in the bearing gap. Thus, in combination with the above-mentioned action of the lubricating-oil composition, the dynamic pressure action allows the oil film of the lubricating-oil composition to be formed in an extremely effective manner in the bearing gap in such a manner that the oil film is continuously maintained.

Further, in the fluid-dynamic bearing according to the present invention, an inner diameter dimension may be 2.0 mm or less, and an axial dimension may be 3.5 mm or less.

The fluid-dynamic bearing according to the present invention can have a high load-carrying capacity as a bearing while preventing an increase in bearing torque. Thus, even when the inner diameter dimension and the axial dimension are small as described above, and thus, an area of an inner peripheral surface of the bearing, in which a radial bearing surface is formed, cannot be sufficiently ensured, required bearing performance can be provided.

Further, the fluid-dynamic bearing as described above can be suitably provided, for example, as a fluid-dynamic bearing device comprising: the above-mentioned fluid-dynamic bearing; a housing having an inner periphery to which the fluid-dynamic bearing is fixed; a rotator having a shaft portion inserted along an inner periphery of the fluid-dynamic bearing; and a radial bearing portion configured to radially support the shaft portion in a non-contact manner through an oil film of the lubricating-oil composition, which is formed in a radial bearing gap between the inner peripheral surface of the fluid-dynamic bearing and an outer peripheral surface of the shaft portion.

Further, in the fluid-dynamic bearing device according to the present invention, the shaft portion being rotatable with respect to the fluid-dynamic bearing in a non-contact manner may have an eccentricity ratio of up to 98%. The "eccentricity ratio" as used herein refers to a ratio of the amount of eccentricity of the shaft portion to a radius value of the radial bearing gap.

As described above, the fluid-dynamic bearing according to the present invention can have a high load-carrying capacity while preventing an increase in bearing torque. Thus, even when the eccentricity ratio is increased, a risk of contact between the shaft portion and the fluid-dynamic bearing can be reduced as much as possible owing to stable oil-film formation ability so that a high load-carrying capacity can be stably achieved.

The fluid-dynamic bearing device as described above comprises the bearing that can have a high load-carrying capacity while preventing an increase in bearing torque as described above. Thus, for example, a motor comprising the fluid-dynamic bearing device can be suitably provided.

Advantageous Effects of Invention

As described above, according to the lubricating-oil composition for a fluid-dynamic bearing of the present invention, the fluid-dynamic bearing, which can provide a high load-carrying capacity as a bearing for small motors while preventing an increase in bearing torque, can be provided.

DESCRIPTION OF EMBODIMENTS

Now, one embodiment of the present invention is described with reference to the drawings. Note that, in the following description, with respect to a fluid-dynamic bearing, a disc portion side of a hub portion is referred to as "upper side," and a bottom portion side of a housing is referred to as "lower side." As a matter of course, the upper and lower sides as defined above do not limit a mode of installation and a mode of use of actual products.

Figure 1:
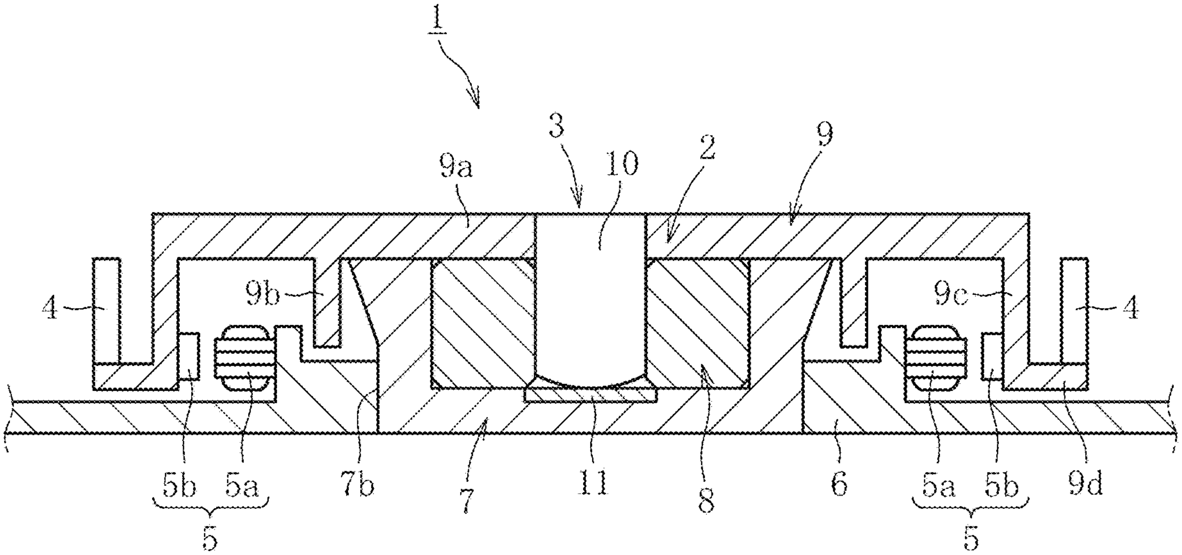
FIG. 1 is a sectional view of a fan motor according to one embodiment of the present invention.

FIG. 1 is a view for schematically illustrating one configuration example of a fan motor 1 according to this embodiment. The fan motor 1 comprises a fluid-dynamic bearing device 2, a plurality of fans 4 provided to a rotator 3 of the fluid-dynamic bearing device 2, and a drive portion 5 configured to rotate the fans 4 together with the rotator 3. The drive portion 5 comprises, for example, coils 5*a* and magnets 5*b* which are opposed to each other across a radial gap. In this embodiment, the coils 8*a* are fixed to a base portion 6 corresponding to a stationary side of the fan motor 1, and the magnets 5*b* are fixed to the rotator 3 corresponding to a rotary side of the fan motor 1.

In the fan motor 1 configured as described above, when the coils 5*a* are energized, an excitation force is generated between the coils 5*a* and the magnets 8*b* so that the magnets 5*b* are rotated. With this rotation, the plurality of fans 4 arranged upright along an outer rim of the rotator 3 are rotated together with the rotator 3. This rotation causes the fans 4 to generate air flow in a direction determined by their shapes (for example, air flow to a radially outer side in this case). In a manner of being drawn by the air flow, air flow from an axially upper side toward an axially lower side of the fan motor 1 is secondarily generated. With the air flow generated around the fan motor 1 in this manner, an information apparatus (not shown) onto which the fan motor 1 is mounted can be cooled.

Further, when the air flow is generated in the axial direction of the fan motor 1 as described above, a force (reaction force) in a direction opposite to the direction of the air flow is generated around the rotator 3 of the fluid-dynamic bearing device 2. A magnetic force (repulsive force) in a direction of cancelling the reaction force is exerted between the coils 5*a* and the magnets Sb. A thrust load generated due to a difference in magnitude between the reaction force and the magnetic force is applied on thrust bearing portions T1 and T2 (refer to FIG. 2 described later) of the fluid-dynamic bearing device 2. The magnetic force in the direction of cancelling the reaction force can be generated by, for example, arranging the coils Sa and the magnets Sb in an axially shifted manner (detailed illustration is omitted). Further, during the rotation of the rotator 3, a radial load is applied to a shaft portion 10 of the fluid-dynamic bearing device 2, which is described later. This radial load is applied to radial bearing portions R1 and R2 of the fluid-dynamic bearing device 2.

Figure 2:
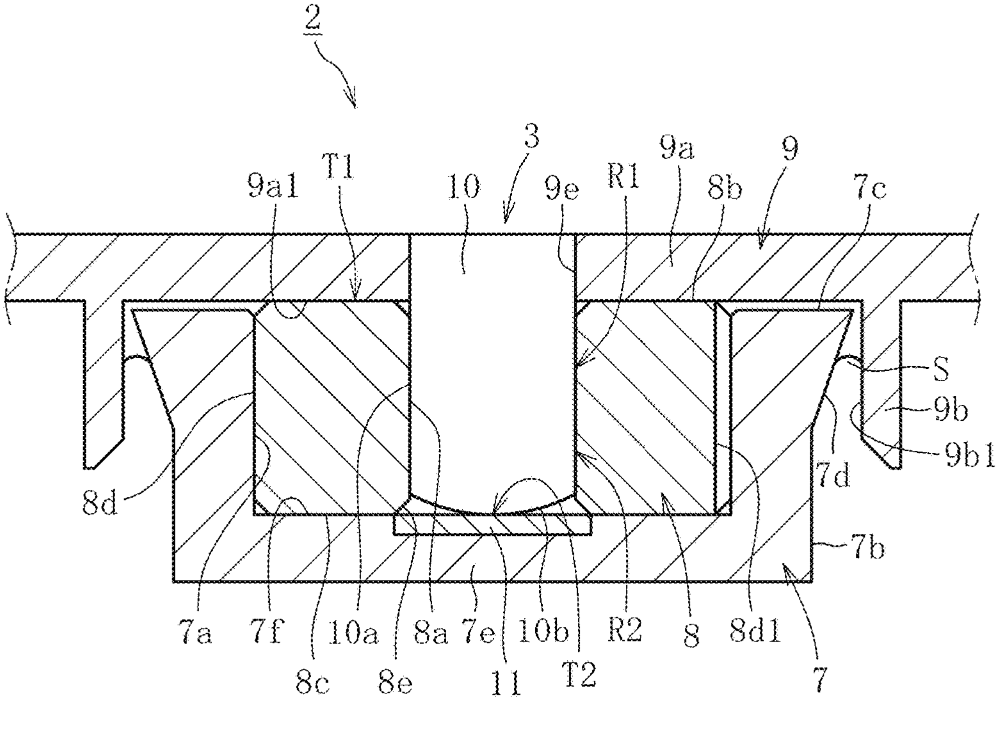
FIG. 2 is a sectional view of a fluid-dynamic bearing device illustrated in FIG. 1.

FIG. 2 is a sectional view of the fluid-dynamic bearing device 2 built in the fan motor 1. The fluid-dynamic bearing device 2 comprises a housing 7, a fluid-dynamic bearing 8 fixed to an inner periphery of the housing 7, and the rotator 3 to be rotated relative to the fluid-dynamic bearing 8.

In this embodiment, the rotator 3 comprises a hub portion 9 arranged on an upper-end opening side of the housing 7, and the shaft portion 10 inserted along an inner periphery of the fluid-dynamic bearing 8.

As illustrated in FIG. 1 and FIG. 2, the hub portion 9 comprises a disc portion 9*a* covering the upper-end opening side of the housing 7, a first cylindrical portion 9*b* extending from the disc portion 9*a* to the axially lower side, a second cylindrical portion 9*c* located on the radially outer side with respect to the first cylindrical portion 9*b* and extending from the disc portion 9*a* to the axially lower side, and a flange portion 9*d* further extending from an axially lower end of the second cylindrical portion 9*c* to the radially outer side. The disc portion 9*a* is opposed to one end surface (upper end surface 8*b*) of the fluid-dynamic bearing 8 fixed to the inner periphery of the housing 7. Further, the plurality of fans 4 are formed integrally with the hub portion 9 in an upright posture along an outer rim of the flange portion 9*d*.

In this embodiment, the shaft portion 10 is formed as a body separate from the hub portion 9, and an upper end thereof is fixed into a mounting hole 9*e* formed in the hub portion 9. In this case, the shaft portion 10 has an outer peripheral surface 10*a* having a constant outer diameter dimension, and a lower end portion 10*b* being continuous with a lower end of the outer peripheral surface 10*a* and having, for example, a partially spherical shape. That is, the shaft portion 10 has a shape insertable from one axial side along an inner periphery of the fluid-dynamic bearing 8. As a matter of course, the shaft portion 10 and the hub portion 9 may be formed integrally of the same material. Alternatively, one of the shaft portion 10 and the hub portion 9 to be made of materials different from each other may be formed through injection molding of a metal or a resin with another one of the shaft portion 10 and the hub portion 9 being used as an insert component.

The housing 7 is formed into a shape with its upper end being opened and its lower end being closed. Further, the fluid-dynamic bearing 8 is fixed to an inner peripheral surface 7*a* of the housing 7, and an outer peripheral surface 7*b* of the housing 7 is fixed to the base portion 6 (refer to FIG. 1). An axial opposing clearance between an upper end surface 7*c* of the housing 7 and a lower end surface 9*a*1 of the disc portion 9*a* of the hub portion 9 is larger than an opposing clearance between the upper end surface 8*b* of the fluid-dynamic bearing 8 and the lower end surface 9*a*1 of the disc portion 9*a*. In this case, the opposing clearances are set so as to have sizes that have substantially no influence on an increase in torque loss during rotational drive.

A tapered sealing surface 7*d* increased in outer diameter dimension as approaching to the upper side is formed on an upper side of an outer periphery of the housing 7. An annular sealing space S gradually reduced in radial opposing clearance from a closed side (lower side) toward an opening side (upper side) of the housing 7 is formed between the tapered sealing surface 7*d* and an inner peripheral surface 9*b*1 of the first cylindrical portion 9*b*. During rotation of the shaft portion 10 and the hub portion 9, the sealing space S is in communication with a radially outer side of a thrust bearing gap in the first thrust bearing portion T1 described later, thereby allowing the lubricating-oil composition to flow in a bearing interior space comprising bearing gaps. Further, a charging amount of the lubricating-oil composition is adjusted so that an oil surface (gas-liquid interface) of the lubricating-oil composition is constantly maintained within the sealing space S under a state in which inner pores of the fluid-dynamic bearing 8 are impregnated with the lubricating-oil composition and the bearing interior space is filled with the same lubricating-oil composition (refer to FIG. 2).

Further, when the housing 7 has a sealing structure as described above, the coils Sa are arranged so as to be positioned on a radially outer side with respect to the first cylindrical portion 9*b* of the hub portion 9 and so as to partially overlap with the first cylindrical portion 9*b* in the axial direction. In this manner, thinning (reduction in the axial dimension) of the housing 7, and in turn, of the fluid-dynamic bearing device 2 is achieved.

Further, in this embodiment, a thrust receiving portion 11 configured to receive the lower end portion 10*b* of the shaft portion 10, which has a spherical shape, is formed in a bottom portion 7*e* of the housing 7. That is, the thrust receiving portion 11 is constantly in contact with the lower end portion 10*b* of the shaft portion 10 under a state after the fluid-dynamic bearing device 2 is completed so that the shall portion 10 can be rotationally supported thereby. It is preferred that an abutment position of the thrust receiving portion 11 in the up-and-down direction with respect to a bearing abutment surface 7*f* of the housing 7 be set, for example, so as to fall within a region of an inner chamfered portion 8*e* of the fluid-dynamic bearing 8 in the up-and-down direction.

The housing 7 may be made of any appropriate material and may have any appropriate makeup. For example, a publicly known material such as a resin or a metal can be appropriately used in accordance with a fixing method for the fluid-dynamic bearing 8 to the housing 7, which is described later.

Figure 3:
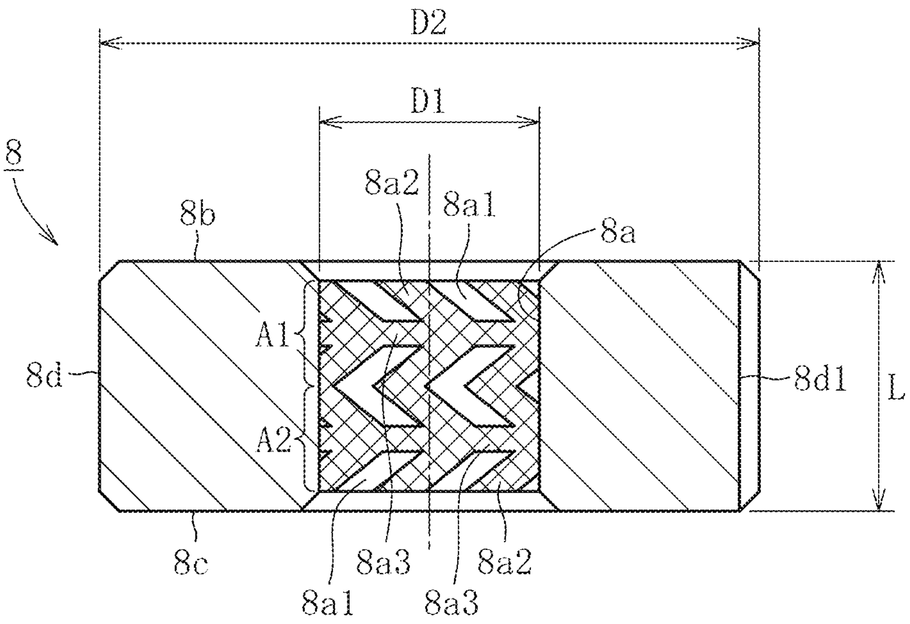
FIG. 3 is a sectional view of a fluid-dynamic bearing illustrated in FIG. 2.
Figure 4:
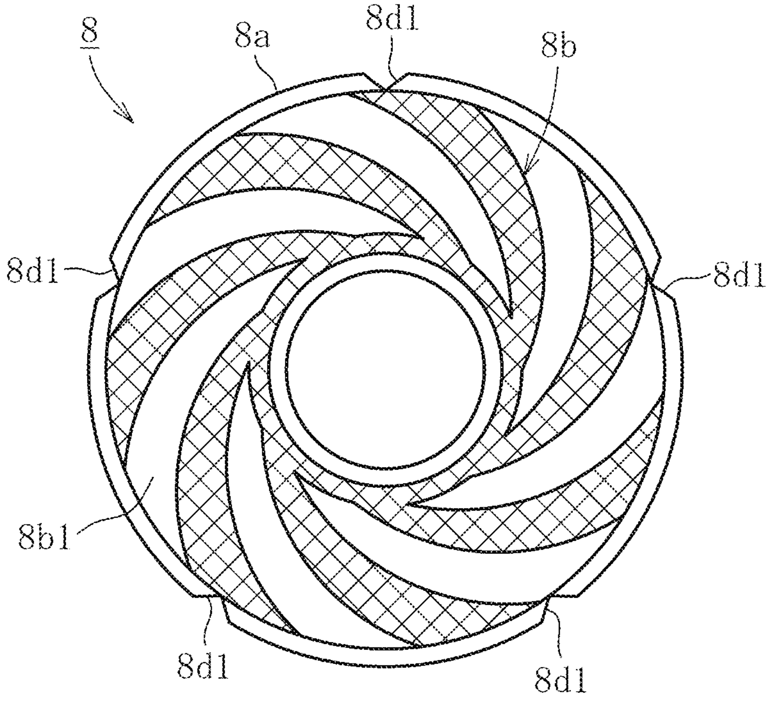
FIG. 4 is a plan view of the fluid-dynamic bearing illustrated in FIG. 2.

The fluid-dynamic bearing 8 is formed of a porous body of a sintered metal obtained through compression molding and sintering of metal powder having predetermined makeup or raw-material powder containing the metal powder as a main component. The fluid-dynamic bearing 8 is formed into a tubular shape. In this embodiment, the fluid-dynamic bearing 8 is formed into a circular cylindrical shape as illustrated in FIG. 4 and the like. In an entirely or a part of an inner peripheral surface 8*a* of the fluid-dynamic bearing 8, an array region of a plurality of dynamic pressure generating grooves Sal is formed as a radial dynamic pressure generating portion. In other words, the fluid-dynamic bearing 8 comprises the porous body configured as described above and the array region of the dynamic pressure generating grooves Sal formed on the inner peripheral surface 8*a* of the porous body. In this embodiment, as illustrated in FIG. 3, in the array region of the dynamic pressure generating grooves 8*a*1, the plurality of dynamic pressure generating grooves 8*a*1 inclined at a predetermined angle with respect to a circumferential direction, inclined ridge portions 8*a*2 partitioning those dynamic pressure generating grooves Sal from each other in the circumferential direction, and belt portions 8*a*3 extending in the circumferential direction and partitioning the dynamic pressure generating grooves 8*a*1 from each other in the axial direction are arrayed in a herringbone pattern (both of the inclined ridge portions 8*a*2 and the belt portions 8*a*3 are indicated by cross-hatching in FIG. 3). Two dynamic pressure generating groove array regions are formed continuously to each other in the axial direction. In this case, both an upper dynamic pressure generating groove array region A1 and a lower dynamic pressure generating groove array region A2 are formed so as to be axially symmetrical with respect to an axial center line (imaginary line connecting axial centers of the belt portion 8*a*3 to each other in the circumferential direction), and are equal to each other in axial dimension.

In this embodiment, in an entirety or a part of the upper end surface 8*b* of the fluid-dynamic bearing 8, an array region of a plurality of dynamic pressure generating grooves 8*b*1 is formed as a thrust dynamic pressure generating portion. For example, as illustrated in FIG. 4, the array region of the dynamic pressure generating grooves 8*b*1 is formed so that the plurality of dynamic pressure generating grooves 8*b*1 extending in a spiral pattern are arrayed in the circumferential direction. In this case, an orientation of the spiral of the dynamic pressure generating grooves **8*b*1 is set to an orientation corresponding to a rotation direction of the rotator 3. Under a state in which the fluid-dynamic bearing device 2 illustrated in FIG. 2 is driven to rotate, the thrust bearing gap of the first thrust bearing portion T1 described later is formed between the array region of the dynamic pressure generating grooves 8*b*1 configured as described above and the opposed lower end surface 9*a*1 of the disc portion 9*a* of the hub portion 9**.

Figure 5:
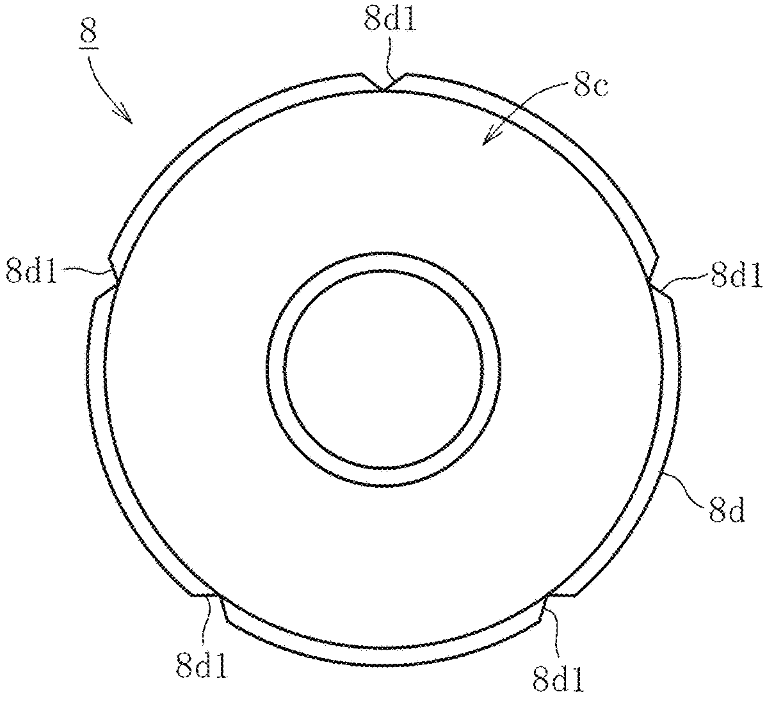
FIG. 5 is a bottom view of the fluid-dynamic bearing illustrated in FIG. 2.

Meanwhile, a thrust dynamic pressure generating portion is not formed in a lower end surface **8*c* of the fluid-dynamic bearing 8. That is, in this embodiment, as illustrated in FIG. 5, the lower end surface 8*c* has a flat shape. The lower end surface 8*c* is in abutment against the housing 7 on a radially outer side of the housing 7 with respect to the thrust receiving portion 11. A position of the bearing abutment surface 7*f* of the housing 7 in the up-and-down direction is appropriately set within a range in which a gap between the upper end surface 8*b* of the fluid-dynamic bearing 8 and the lower end surface 9*ai* of the hub portion 9** can function as the thrust bearing gap.

In an outer peripheral surface **8*d* of the fluid-dynamic bearing 8, one or a plurality of (five in this embodiment) axial grooves 8*d*1 are formed (refer to, for example. FIG. 4). Under a state in which the fluid-dynamic bearing 8 is fixed to the housing 7, passages for the lubricating-oil composition are formed between the axial grooves 8*d*1 and the inner peripheral surface 7*a* of the housing 7 (refer to FIG. 2**).

Next, referring to FIG. 3, various dimensions of the fluid-dynamic bearing 8 are described. An axial dimension L (axial distance between both the end surfaces **8*b* and 8*c*) of the fluid-dynamic bearing 8 is set to 4.8 mm or less, preferably 3.5 mm or less, more preferably 1.8 mm or less in terms of thinning of the fluid-dynamic bearing device 2, and in turn, of the fan motor 1**. Meanwhile, in terms of ensuring required radial bearing rigidity, the axial dimension L is set to 0.8 mm or more, preferably 1.1 mm or more.

An inner diameter dimension D1 (strictly, inner diameter dimension of each of the belt portions **8*a*3 that are smallest diameter portions as well as the inclined ridge portions 8*a*2 on the inner peripheral surface Sa) may basically be any appropriate dimension. In terms of, for example, ensuring biting performance of a sizing pin into the inner peripheral surface 8*a* at the time of dynamic pressure generating groove sizing described later, the inner diameter dimension D1 is desirably 1.2 mm or more, more desirably 1.5 mm or more. Meanwhile, in terms of avoiding a risk of difficulty in reliable transfer of a press-fit force to a surface layer portion of the inner peripheral surface 8*a* at the time of the dynamic pressure generating groove sizing due to a resulting increase in thickness dimension "t", which is larger than required, the inner diameter dimension D1** is desirably 2.5 mm or less, more desirably 2.0 mm or less.

An outer diameter dimension D2 of the fluid-dynamic bearing 8 may also basically be any appropriate dimension. In consideration of a relationship with, for example, required inner diameter dimension D1 and thickness dimension "t", the outer diameter dimension D2 is desirably 2.5 mm or more, more desirably 3.0 mm or more. From a similar point of view, the outer diameter dimension D2 is desirably 5.0 mm or less, more desirably 4.5 mm or less.

The thickness dimension "t" {=(D2−D1)/2} of the fluid-dynamic bearing 8 may basically be any appropriate dimension. For example, in terms of ensuring a required thrust bearing area on the upper end surface **8*b***, it is preferred that the thickness dimension "t" be set to 0.5 mm or more. Meanwhile, in terms of enabling transfer of a sufficient compressing force from a die to a surface layer portion of an inner peripheral surface of a sintered compact at the time of dynamic pressure generating groove sizing, it is preferred that the thickness dimension "t" be set to 1.5 mm or less.

Next, description is given of makeup when the fluid-dynamic bearing 8 is formed of a porous body of a sintered metal. The fluid-dynamic bearing 8 is obtained, for example, through compression molding and sintering of raw-material powder containing one of copper-based powder and iron-based powder in the largest amount and another one thereof in second largest amount. In other words, the porous body of the fluid-dynamic bearing 8 substantially has makeup with one of copper and iron as a main component and another one thereof as a second component (component contained in the second largest amount). The copper-based powder as used herein comprises not only pure copper powder but also copper alloy powder. Further, pure copper comprises not only copper at a purity of 100% but also copper at a purity of 99.99% or more, which is industrially accepted as pure copper. Similarly, the iron-based powder as used herein comprises not only pure iron powder but also iron alloy powder of stainless steel or the like. Further, pure iron as used herein comprises not only pure iron at a purity of 100% but also iron at a purity of 99.99% or more, which is industrially accepted as pure iron. A kind and a blending ratio of powder corresponding to a third or subsequent component may be determined appropriately as long as the above-mentioned makeup (powder blending ratio) is established.

As makeup (powder blending ratio) of the raw-material powder, for example, [copper-based powder: from 50% by weight to 70% by weight, iron-based powder: from 30% by weight to 48% by weight, tin powder: from 0% to 5%] can be used. A specific example thereof comprises: [pure iron powder of 140 mesh or less: from 38% by weight to 42% by weight, tin powder of 330 mesh or less: from 1% to 3%, pure copper powder of 200 mesh or less: balance].

Next, a density ratio of the fluid-dynamic bearing 8 is described. The density ratio of the fluid-dynamic bearing 8 as a whole bearing is set to, for example, 80% or more and 95% or less. The density ratio can be set by, for example, adjusting a material, a particle diameter (distribution), a blending ratio, or the like of metal powder serving as a raw material. Note that, the fluctuation of the density ratio in this case can be evaluated with a microporosity that has a certain correlation with the density ratio. The "microporosity" as used herein is represented in ratio (percentage) of a volume of micropores per unit volume of the bearing, and empirically has a negative correlation with the density ratio (correlation coefficient of −1).

Further, a surface porosity of the inner peripheral surface **8*a*, particularly, surface porosities of inner peripheral surfaces of the inclined ridge portions 8*a*2 and the belt portions 8*a*3**, which serve as a radial bearing surface, are adjusted to, for example, 15% or less. The surface porosity can be adjusted by, for example, rotary sizing described later.

As a matter of course, the makeup and the blending ratio of the raw-material powder, the density ratio, and the surface porosity described above are merely examples, and may have appropriate values in accordance with usage or an individual request.

The fluid-dynamic bearing 8 configured as described above is manufactured through, for example, a compacting step S1, a sintering step S2, a dynamic pressure generating groove sizing step S3, and an oil impregnation step S4. In this case, a dimension sizing step S21 and a rotary sizing step S22 may be set after the sintering step S2 and before the dynamic pressure generating groove sizing step S3.

(S1) Compacting Step

First, the raw-material powder is prepared as a material for the fluid-dynamic bearing 8 to be finished into a complete product, and then is compressed into a predetermined shape through die press molding. Specifically, although not shown, the compression molding of the raw-material powder is performed by using a molding die set comprising a die, a core pin to be inserted and arranged into a hole of the die, a lower punch arranged between the die and the core pin, and configured to be capable of being raised and lowered relative to the die, and an upper punch configured to be capable of being displaced (raised and lowered) relative to both the die and the lower punch. In this case, the raw-material powder is charged into a space defined by an inner peripheral surface of the die, an outer peripheral surface of the core pin, and an upper end surface of the lower punch. Under a state in which the lower punch is fixed, the upper punch is lowered so that the charged raw-material powder is pressurized in the axial direction. Then, under the pressurized state, the upper punch is lowered to a predetermined position so that the raw-material powder is compressed into a predetermined axial dimension. In this way, a green compact is obtained.

(S2) Sintering Step

After the green compact is obtained in the above-mentioned manner, the green compact is sintered at a temperature appropriate to a kind of the raw-material powder (for example, a melting point of a metal contained as a main component). With this, a sintered compact is obtained.

(S21) Dimension Sizing Step and (S22) Rotary Sizing Step

Then, dimension sizing is performed on the sintered compact so that an outer diameter dimension, an inner diameter dimension, and an axial dimension of the sintered compact are corrected into dimensions in accordance with those of a complete product. In addition, the surface porosity of the inner peripheral surface 8*a* is adjusted to a ratio (for example, within the above-mentioned numerical range of 15% or less) appropriate to a fluid-dynamic bearing having the dynamic pressure generating portion on the inner peripheral surface. At this stage, the array regions A1 and A2 of the predetermined dynamic pressure generating grooves Kal have not yet been formed in the inner peripheral surface 8*a* of the sintered compact. Similarly, although not shown, the array regions of the predetermined dynamic pressure generating grooves 8*b*1 have not yet been formed in the upper end surface 8*b* of the sintered compact.

(S3) Dynamic Pressure Generating Groove Sizing Step

Through predetermined dynamic pressure generating groove sizing on the sintered compact that is obtained through the series of steps described above, the array regions A1 and A2 of the dynamic pressure generating grooves 8*a*1 are molded in the inner peripheral surface 8*a* of the sintered compact. Specifically, although not shown, a molding apparatus comprising a die having a press-fit hole for the sintered compact, a sizing pin arranged so as to be insertable into the press-fit hole of the die, a lower punch arranged between the die and the sizing pin, and configured to be capable of being raised and lowered relative to the die, and an upper punch configured to be capable of being raised and lowered relative to both the die and the lower punch is used to perform predetermined molding on the sintered compact. In this case, on an outer peripheral surface of the sizing pin, there is formed a molding die in conformity with the patterns of the dynamic pressure generating groove array regions A1 and A2 (FIG. 3) on the inner peripheral surface 8*a* to be molded. On a lower end surface of the upper punch, there is formed a molding die in conformity with the patterns of the array region of the dynamic pressure generating grooves 8*b*1 (FIG. 4) of the upper end surface 8*b* to be molded. Thus, under a state in which the sintered compact is arranged on an upper end surface of the die and the sizing pin is inserted along an inner periphery of the sintered compact, the upper punch is lowered to press an upper end surface of the sintered compact. With this, the sintered compact is pressed into the press-fit hole of the die so that an outer peripheral surface of the sintered compact is compressed, and the molding die of the sizing pin inserted along the inner periphery in advance is caused to bite into the inner peripheral surface of the sintered compact. In this way, the pattern of the molding die is transferred onto the inner peripheral surface of the sintered compact so that the array regions A1 and A2 of the dynamic pressure generating grooves 8*a*1 are molded on the inner peripheral surface. Further, at this time, the molding die formed on the lower end surface of the upper punch is caused to bite into the upper end surface of the sintered compact. With this, the pattern of the molding die is transferred onto the upper end surface. In this way, the array region of the dynamic pressure generating grooves 8*b*1 is correspondingly molded.

After the predetermined array regions of the dynamic pressure generating grooves 8*a*1 and 8*b*1 are molded respectively in the inner peripheral surface and the upper end surface of the sintered compact in this way, the die is lowered relative to the lower punch so that the sintered compact is released from the restriction by the die. With this, the sintered compact is caused to spring back radially outward. As a result, the sintered compact can be removed from the sizing pin.

(S4) Oil Impregnation Step

The lubricating-oil composition is impregnated into inner pores of the sintered compact (porous body) obtained in the above-mentioned manner to thereby complete the fluid-dynamic bearing 8.

In this case, as the lubricating-oil composition for the fluid-dynamic bearing 8, a lubricating-oil composition having the following makeup is used. That is, as the lubricating-oil composition according to the present invention, there is used a lubricating-oil composition that contains a base oil having a kinematic viscosity of more than 30 $mm^2/s$ and 80 $mm^2/s$ or less at a temperature of 40° C. and has makeup adjusted so as to have a kinematic viscosity of 90 $mm^2/s$ or more and 140 $mm^2/s$ or less at a temperature of 40° C.

The base oil may have any appropriate makeup as long as the above-mentioned condition of the kinematic viscosity is satisfied. However, when the base oil is a mixture of a non-polar oil and a polar oil, it is preferred that a ratio of the non-polar oil to an entirety of the base oil be 20 wt % or more and 30 wt % or less.

In this case, any appropriate kind of non-polar oil can basically be used as the non-polar oil. For example, a synthetic hydrocarbon oil made from poly-α-olefin or a hydride thereof, which can provide excellent characteristics as the fluid-dynamic bearing, for example, a wide temperature range of use, excellent lubricity, desirable initial conformability, and desirable durability, is suitable. In this case, it is preferred that a ratio of the synthetic hydrocarbon oil made from poly-α-olefin or a hydride thereof to the entirety of the base oil be 20 wt % or more and 30 wt % or less.

In this case, poly-α-olefin has an average molecular weight of from 200 to 1,600, preferably, from 400 to 800. Poly-α-olefin obtained by polymerizing decene-1, isobutene, or the like with a Lewis acid complex, an aluminum oxide catalyst, or the like is appropriate. The hydride of poly-α-olefin is obtained by, for example, hydrogenating poly-α-olefin under the presence of a hydrogenation catalyst.

Any appropriate kind of polar oil can basically be used as the polar oil, and, for example, an ester oil excellent in evaporation characteristic, lubricity, and abrasion resistance is suitably used. In this case, an ester to be used may be any of a monoester (ester of a monohydric alcohol and a monovalent fatty acid), a diester (ester of a monohydric alcohol and a divalent fatty acid), a polyol ester (such as an ester of an alcohol having a neopentyl skeleton and a monovalent fatty acid), and a complex ester (oligomer ester obtained by adding a polyvalent fatty acid to a polyol ester being a raw material and cross-linking polyol).

Alternatively, to the lubricating-oil composition according to this embodiment, publicly known viscosity index improver, metal deactivator, antioxidant, rust inhibitor, pour-point depressant, ashless dispersant, metal-based detergent, surfactant, friction modifier, and the like can be added as a component other than the base oil.

For any kind of the additives descried above, it is important to set a kind of additive, an addition ratio, the number of additives, and the like so that the kinematic viscosity of the lubricating-oil composition satisfies the above-mentioned numerical range (90 $mm^2/s$ or more and 140 $mm^2/s$ or less) at a temperature of 40° C.

The fluid-dynamic bearing 8 is fixed to the inner periphery of the housing 7 by a publicly-known method such as press-fitting, press-fitting with bonding, bonding, or welding. After that, the shaft portion 10 of the rotator 3 is inserted along the inner periphery of the fluid-dynamic bearing 8. Then, as a final step, an internal space of the bearing is charged with (filled with) the lubricating-oil composition having the makeup described above to thereby complete the fluid-dynamic bearing device 2 under a state in which an interface of the lubricating-oil composition is held in the sealing space S (refer to FIG. 2).

The oil impregnation step S4 may be carried out, for example, after the sintered compact for forming the fluid-dynamic bearing 8 is fixed to the inner periphery of the housing 7 so that an impregnation operation for the fluid-dynamic bearing 8 with the lubricating-oil composition and a filling operation for the internal space of the fluid-dynamic bearing device 2 with the lubricating-oil composition are performed simultaneously.

In the fluid-dynamic bearing device 2 configured as described above, during the rotation of the shaft portion 10 (rotator 3), the regions on the inner peripheral surface 8*a* of the fluid-dynamic bearing 8 (two upper and lower array regions A1 and A2 of the dynamic pressure generating grooves 8*a*1), which serve as the radial bearing surface, are opposed to the outer peripheral surface 10*a* of the shaft portion 10 across the radial bearing gap. Then, along with the rotation of the shaft portion 10, the lubricating-oil composition in the radial bearing gap is forced toward an axial center in each of the array regions A1 and A2 of the dynamic pressure generating grooves 8*a*1. With this, a pressure of the lubricating-oil composition is increased in a region on an axial center side (belt portion 8*a*3 in this case). Due to such a dynamic pressure action of the dynamic pressure generating grooves 8*a*1, the oil film of the lubricating-oil composition is formed in the radial bearing gap, and the first radial bearing portion R1 and the second radial bearing portion R2 configured to radially support the shaft portion 10 in a freely rotatable and non-contact manner are formed separately from each other in the axial direction.

Further, in the thrust bearing gap between the upper end surface 8*b* of the fluid-dynamic bearing 8 (array region of the dynamic pressure generating grooves 8*b*1) and the opposed lower end surface 9*a*1 of the hub portion 9, an oil film of the lubricating-oil composition is formed due to a dynamic pressure action of the dynamic pressure generating grooves 8*b*1. Then, due to a pressure of the oil film, the first thrust bearing portion T1 configured to support the rotator 3 in a non-contact manner in thrust directions is formed. Further, the lower end portion 10*b* of the shaft portion 10 is supported in a rotatable and contact manner by the thrust receiving portion 11 formed in the bottom portion 7*e* of the housing 7. As a result, the second thrust bearing portion T2 configured to support the rotator 3 in the thrust directions in a contact manner is formed.

As described above, in the lubricating-oil composition for the fluid-dynamic bearing 8 according to this embodiment, as the base oil, a base oil having the kinematic viscosity of more than 30 $mm^2/s$ and 80 $mm^2/s$ or less at a temperature of 40° C. is used, and the makeup of the lubricating-oil composition is adjusted so that the lubricating-oil composition has the kinematic viscosity of 90 $mm^2/s$ or more and 140 mm/s or less at a temperature of 40° C. Further, in this embodiment, for the adjustment of the viscosity, the amount of addition of a polymer-based viscosity index improver is adjusted to 4 wt % or less. With the adjustment of the kinematic viscosities of the base oil and the lubricating-oil composition as described above, the oil film can be stably formed in the radial bearing gap regardless of a size of the radial bearing gap. Thus, the fluid-dynamic bearing 8 can have a high load-carrying capacity. Further, as a result of large eccentricity of the shaft portion 10, the oil film of the lubricating-oil composition can be stably formed in the radial bearing gap even when the radial bearing gap is reduced. With the adjustment of the makeup of the lubricating-oil composition as described above, for example, addition of the viscosity index improver as little as possible, a viscosity at a low temperature at the time of start of activation can be prevented from being increased more than required. Thus, a required high load-carrying capacity can be stably achieved without increasing the bearing torque.

Further, in this embodiment, the mixture of a non-polar oil and a polar oil is used as the base oil, and the ratio of the non-polar oil to the base oil as a whole is set to 20 wt % or more and 30 wt % or less. In this way, when the ratio of the non-polar oil having a relatively high electrical resistivity is set to 20 wt % or more, an electrical resistivity of the entire lubricating-oil composition can be held down to such a degree that the energization of the shaft portion 10 and the fluid-dynamic bearing 8 via the lubricating-oil composition can be prevented as much as possible. Thus, an erroneous determination in an evaluation process for the load-carrying capacity based on the electrical resistance method (refer to a description given later for details) can be prevented as much as possible to thereby enable appropriate evaluation of the load-carrying capacity of the fluid-dynamic bearing 8. Further, when the ratio of the non-polar oil is held down to 30 wt % or less, an increase in viscosity of the lubricating-oil composition in a low temperature state can be prevented and hence, an increase in evaporation amount can be prevented.

Further, in this embodiment, the synthetic hydrocarbon oil made from poly-α-olefin or a hydride thereof is used as the non-polar oil, and hence a temperature range of use for the lubricating-oil composition can be broadened. Further, the fluid-dynamic bearing can be provided with desirable initial conformability together with excellent lubricity. Further, improvement in durability can be achieved.

Further, in this embodiment, an ester oil is used as the polar oil, and hence an evaporation characteristic, the lubricity, and abrasion resistance of the lubricating-oil composition can be improved. In particular, when a synthetic hydrocarbon oil made from poly-α-olefin or a hydride thereof is used as the non-polar oil, the use of the ester oil as a polar oil allows a problem in solubility, which is a disadvantage of polyolefins, to be overcome. Further, with mixing of an ester oil with the synthetic hydrocarbon oil made from poly-α-olefin or a hydride thereof, desirable bearing performance of the fluid-dynamic bearing can be stably maintained over a long period of time.

One embodiment of the present invention has been described above. The lubricating-oil composition for a fluid-dynamic bearing according to the present invention, the fluid-dynamic bearing obtained through impregnation of the lubricating-oil composition, and the fluid-dynamic bearing device comprising this bearing are not limited to those exemplified above, and may have any appropriate configurations within the scope of the present invention.

Figure 6:
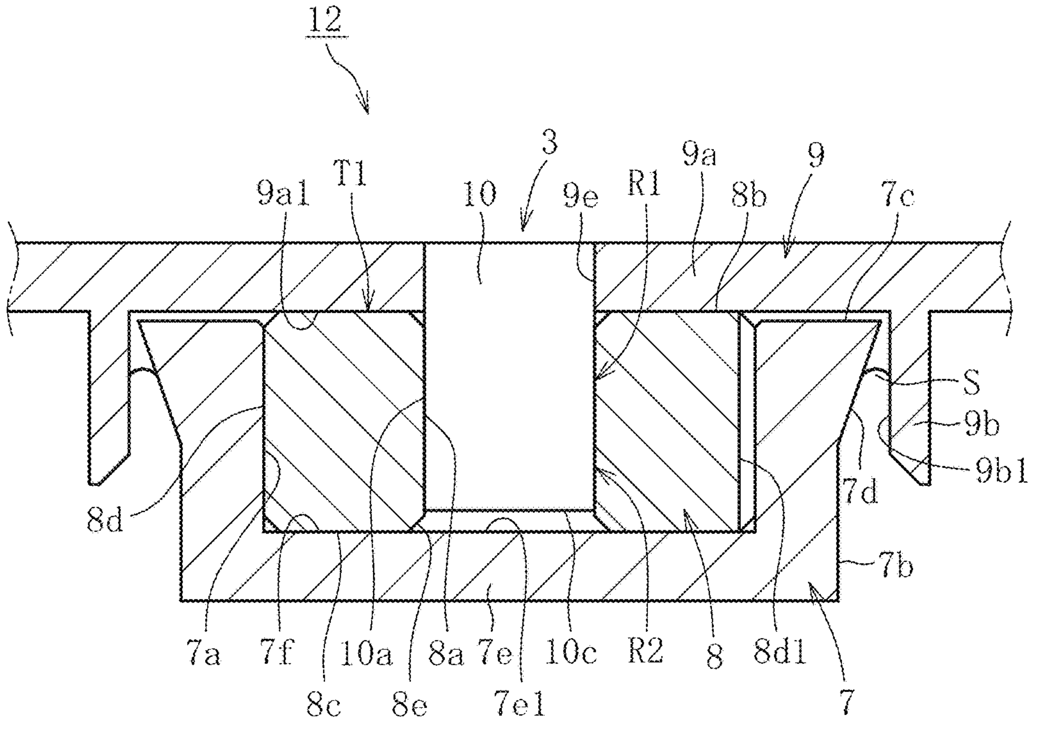
FIG. 6 is a sectional view of a fluid-dynamic bearing device according to another embodiment of the present invention.

FIG. 6 is a sectional view of a fluid-dynamic bearing device 12 according to another embodiment of the present invention. As illustrated in FIG. 6, the fluid-dynamic bearing device 12 according to this embodiment differs from the fluid-dynamic bearing device 2 illustrated in FIG. 2 in that the fluid-dynamic bearing device 12 has only a first thrust bearing portion T1. More specifically, in the fluid-dynamic bearing device 12 according to this embodiment, a predetermined thrust-direction gap is constantly defined between a lower end surface 10*c* of a shaft portion 10 and an upper end surface 7*e*1 of a bottom portion 7*e* of a housing 7. In this case, a size of an opposing clearance (thrust-direction gap) between the upper end surface 7*e*1 of the bottom portion 7*e* and the lower end surface 10*c* of the shaft portion 10 is larger than an opposing clearance between an upper end surface 8*b* of a fluid-dynamic bearing 8 and a lower end surface 9*a*1 of a disc portion 9*a*, and, in this case, is set to such a size that is considered not to substantially affect an increase in loss torque during rotational drive. Other configurations are the same as those of the fluid-dynamic bearing device 2 illustrated in FIG. 2 and the like, and hence a detailed description thereof is omitted.

Also in the fluid-dynamic bearing device 12 according to this embodiment, a base oil having a kinematic viscosity of more than 30 $mm^2/s$ and 80 $mm^2/s$ or less at a temperature of 40° C. is used as a base oil, and a lubricating-oil composition for a fluid-dynamic bearing 8, which is obtained by adjusting makeup so that the lubricating-oil composition has a kinematic viscosity of 90 $mm^2/s$ or more and 140 $mm^2/s$ or less at a temperature of 40° C., is used. In this manner, an oil film can be stably formed in a radial bearing gap regardless of a size of the radial bearing gap. Thus, the fluid-dynamic bearing 8 can have a high load-carrying capacity. Further, a required thrust bearing area can be ensured on an upper end surface 8*b* of the fluid-dynamic bearing 8. Thus, even when a thrust bearing portion (first thrust bearing portion T1) is formed only on the upper end surface 8*b* side of the fluid-dynamic bearing 8, excellent rotational accuracy can be achieved. Accordingly, as illustrated in FIG. 6, sufficient thrust bearing performance can be provided without supporting the lower end surface 10*c* of the shaft portion 10 in the thrust directions. Thus, costs can be reduced correspondingly to simplification of a lower end shape of the shaft portion 10, such as omission of a thrust receiving portion 11.

As a matter of course, a publicly known radial dynamic pressure generating portion having a shape other than a dynamic pressure generating groove, such as so-called multi-arc shape, step-like shape, or corrugated shape can be used for any one or both of the radial dynamic pressure generating portions (array regions A1 and A2 of the dynamic pressure generating grooves 8*a*1 in FIG. 3) that form the radial bearing portions R1 and R2 in cooperation with an outer peripheral surface 10*a* of the shaft portion 10.

In the description given above, the housing 7 of the fluid-dynamic bearing device 2 is fixed to an inner periphery of the base portion 6 of the fan motor 1. However, the housing 7 may be directly mounted to, for example, a base portion of an information apparatus (not shown) to which the fan motor 1 is to be mounted. Alternatively, apart corresponding to those base portions may be formed integrally with the housing 7.

Further, in the description given above, an external force for forcing the shaft portion 10 toward the bottom portion 7*e* of the housing 7 is exerted on the shaft portion 10 (rotator 3) by arranging the magnets Sb and the coils 5*a* in an axially shifted manner. However, a method of exerting such an external force on the shaft portion 10 is not limited to that described above. Although not shown, the magnetic force can be exerted on the rotator 3 by, for example, arranging magnetic members that can attract the magnets 5*b* so that the magnetic members are opposed to the magnets Sb in the axial direction. Further, when a thrust force as a reaction force to an air-sending action is sufficiently large and the shaft portion 10 can be forced downward only with the thrust force, a magnetic force (magnetic attraction force) as the external force for forcing the shaft portion 10 downward is not required to be used.

Further, the description has been given above of a case in which the present invention is applied to the fluid-dynamic bearing device 2 in which the rotator 3 having the fan 4 is fixed to the shaft portion 10. However, the present invention is also preferably applicable to the fluid-dynamic bearing device 2 in which a disc hub having a disc mounting surface, or a polygon mirror is fixed as the rotator 3 to the shaft portion 10. That is, the present invention is also preferably applicable to the fluid-dynamic bearing device 2 to be built not only in the fan motor 1 as illustrated in FIG. 1 but also in other electrical apparatus such as a spindle motor for a disc device or a polygon scanner motor for a laser beam printer (LBP).

Example

Now, an example for verifying actions and effects of the present invention is described.

In this example, lubricating-oil compositions having the makeup according to the present invention (Examples 1 to 3) and lubricating-oil compositions having makeup other than that according to the present invention (Comparative Examples 1 to 4) were prepared to evaluate a kinematic viscosity and a viscosity of each of the lubricating-oil compositions. Further, a characteristic relating to a load-carrying capacity was evaluated for a fluid-dynamic bearing device obtained by impregnating a fluid-dynamic bearing with each of the lubricating-oil compositions so that a bearing internal space was filled with the lubricating-oil composition.

In this example, a lubricating-oil composition containing a mixture of a non-polar oil and a polar oil as a base oil was used as each of the lubricating-oil compositions to be evaluated. Specifically, a synthetic hydrocarbon oil made from poly-α-olefin (PAO) was used as the non-polar oil, a polyol ester oil and a diester oil were used as the polar oil, and a polymethacrylate-based viscosity index improver was used as a viscosity index improver. Further, all the used lubricating-oil compositions contained an antioxidant and a rust inhibitor. In Table 1, there are shown ratios (blending ratios) [wt %] of the non-polar oil, the polar oil, and the viscosity index improver to the lubricating-oil compositions according to Examples 1 to 3 and Comparative Examples 1 to 4.

TABLE 1

| | Example 1 | Example 2 | Example 3 | Comparative Example 1 | Comparative Example 2 | Comparative Example 3 | Comparative Example 4 |
|---|---|---|---|---|---|---|---|
| Polar oil, wt % | 70 | 70 | 70 | 75 | 75 | 70 | 73 |
| Non-polar oil, wt % | 25 | 25 | 25 | 16 | 17 | 25 | 23 |
| Viscosity index improver, wt % | 3 | 3 | 3 | 7 | 6 | 3 | 2 |
| Other additive(s), wt % | 2 | 2 | 2 | 2 | 2 | 2 | 2 |
| Total, wt % | 100 | 100 | 100 | 100 | 100 | 100 | 100 |

Further, the kinematic viscosity [mm$^2$/s] of the base oil at a temperature of 40° C. was acquired based on JIS K 2283. The kinematic viscosities of the base oils of Examples 1 to 3 and Comparative Examples 1 to 4 at a temperature of 40° C. are as shown in Table 2.

Further, the kinematic viscosity [mm$^2$/s] of each of the lubricating-oil compositions at a temperature of 40° C. was acquired based on JIS K 2283. The kinematic viscosities of the lubricating-oil compositions of Examples 1 to 3 and Comparative Examples 1 to 4 at a temperature of 40° C. are as shown in Table 2.

Further, a viscosity [mPa·s] of each of the lubricating-oil compositions at a temperature of 40° C. was acquired by using a cone-and-plate rotational viscometer (shear rate: 300 s$^{-1}$). The viscosities of the lubricating-oil compositions of Examples 1 to 3 and Comparative Examples 1 to 4 at a temperature of −40° C. are as shown in Table 2.

Further, for the characteristic relating to the load-carrying capacity of the fluid-dynamic bearing device obtained through impregnation of and filling with each of the lubricating-oil compositions, a floating minimum rotation speed based on an electrical resistance method was measured. Further, a maximum value of an eccentricity ratio of the shaft portion being rotatable with respect to the fluid-dynamic bearing in a non-contact manner was obtained based on the result of the measurement.

Among the above-mentioned values, the floating minimum rotation speed was measured in the following manner. That is, although not shown, an elongated shaft portion was inserted into the fluid-dynamic bearing according to the present invention. A motor was coaxially coupled to one axial end of the shaft portion, and the fluid-dynamic bearing was fixed to an inner periphery of a housing. Then, a gap between the shaft portion and the fluid-dynamic bearing was sealed with a sealing member. After that, the shaft portion was driven at a predetermined rpm by the motor under a state in which a predetermined load, in this case, a radial load (two kinds of loads of 3N and 6N) was being applied to the fluid-dynamic bearing via the housing. The rpm was gradually decreased from 2,000 min$^{-1}$ by 100 min$^{-1}$ for each time. Then, the rpm of the shaft portion at the time when conduction (electrical connection) between the shaft portion and the fluid-dynamic bearing was detected was measured with a rotation speed sensor provided to another axial end of the shaft portion. The measured rpm was obtained as the floating minimum rotation speed [min$^{-1}$]. The floating minimum rotation speeds of Examples 1 to 3 and Comparative Examples 1 to 4 are as shown in Table 1.

For the eccentricity ratio, a value back-calculated from the load (3N or 6N) used at the time of testing was obtained by using a calculation program that received the eccentricity ratio of the shaft portion at the time of the detection of the conduction between the shaft portion and the fluid-dynamic bearing as described above, a radius value of the radial bearing gap between the fluid-dynamic bearing and the shaft portion, and the rotation speed (floating minimum rotation speed) as input values and output the load as an output value. The eccentricity ratios of Examples 1 to 3 and Comparative Examples 1 to 4 are as shown in Table 2.

TABLE 2

| | Example 1 | Example 2 | Example 3 | Comparative Example 1 | Comparative Example 2 | Comparative Example 3 | Comparative Example 4 |
|---|---|---|---|---|---|---|---|
| Kinematic viscosity of base oil (40° C.), mm$^2$/s | 34 | 33 | 46 | 23 | 34 | 30 | 83 |
| Ratio of non-polar oil to base oil, wt % | 26 | 26 | 26 | 18 | 18 | 26 | 24 |
| Kinematic viscosity of lubricating-oil composition (40° C.), mm$^2$/s | 101 | 104 | 115 | 105 | 115 | 94 | 144 |
| Viscosity of lubricating-oil composition (−40° C.), mPa · s | 19,000 | 13,000 | 25,000 | 13,000 | 17,000 | 15,000 | 57,000 |
| Floating minimum rotation speed, min$^1$ | 400 (6N) | 200 (3N) | 200 (3N) | 400 (3N) | 600 (6N) | 1,000 (6N) | 200 (3N) |
| Eccentricity ratio, % | 95 | 95 | 95 | 87 | 91 | 83 | 95 |

As shown in Table 2, when Examples 1 to 3 and Comparative Example 1 are compared to each other, Comparative Example 1 and Examples 1 to 3 had equivalent values for the kinematic viscosity of the lubricating-oil composition. Meanwhile, the kinematic viscosity of the base oil in Comparative Example 1 was below the numerical range according to the present invention. In this case, the floating minimum rotation speed of Comparative Example 1 was the same value as the floating minimum rotation speed of Example 1, but under the load different from that of Example 1 (half the load of Example 1). From this result, it is understood that the load-carrying capacity of Comparative Example 1 is smaller than that of Example 1. Further, the floating minimum rotation speed of Comparative Example 1 was significantly higher than the floating minimum rotation speeds of Examples 2 and 3 even under the same level of the load. From this result, it is understood that the load-carrying capacity of Comparative Example 1 is smaller than the load-carrying capacities of Example 2 and Example 3.

When Example 1 and Comparative Example 2 are compared to each other, Comparative Example 2 and Example 1 had equivalent values for the kinematic viscosity of the base oil and the kinematic viscosity of the lubricating-oil composition. Meanwhile, a content ratio of the non-polar oil to the base oil in Comparative Example 2 was below the numerical range according to the present invention. Thus, there is a high possibility in that the floating minimum rotation speed of Comparative Example 2 may have been measured larger than an actual value, and thus the floating minimum rotation speed of Comparative Example 2 had low reliability as an index indicating the load-carrying capacity.

When Examples 1 to 3 and Comparative Example 3 are compared to each other, Comparative Example 3 and Examples 1 to 3 had equivalent values for the kinematic viscosity of the lubricating-oil composition. Meanwhile, the kinematic viscosity of the base oil in Comparative Example 3 was below the numerical range (more than 30 $mm^2/s$ and 80 $mm^2/s$ or less) according the present invention. Therefore, the floating minimum rotation speed of Comparative Example 3 was significantly larger than that of Example 1 even under the same level of the load. From this result, it is understood that the load-carrying capacity of Comparative Example 3 is smaller than that of Example 1. Further, when Comparative Example 3 and Examples 2 and 3 are compared to each other, a magnitude of the load on Comparative Example 3 was twice a magnitude of the load on Examples 2 and 3. Meanwhile, the floating minimum rotation speed of Comparative Example 3 was five times larger than those of Examples 2 and 3. From this result, it is understood that the load-carrying capacity of Comparative Example 3 is smaller than the load-carrying capacities of Examples 2 and 3.

When Examples 1 to 3 and Comparative Example 4 are compared to each other, the kinematic viscosity of the base oil and the kinematic viscosity of the lubricating-oil composition in Comparative Example 4 were both larger than the kinematic viscosities of Examples 1 to 3. Meanwhile, both of the kinematic viscosities of Comparative Example 4 exceeded the numerical ranges according to the present invention (base oil: more than 30 $mm^2/s$ and 80 $mm^2/s$ or less, lubricating-oil composition: 90 $mm^2/s$ or more and 140 $mm^2/s$ or less). Thus, the load-carrying capacity of Comparative Example 4 (floating minimum rotation speed, eccentricity ratio) was at the same level as that of the load-carrying capacities of Example 1 to 3. Meanwhile, the viscosity of the lubricating-oil composition at a low temperature was larger than the viscosities of Examples 1 to 3. Thus, there arises a risk of excessive power consumption (bearing torque) of the motor or a risk of failing to activate the motor.

REFERENCE SIGNS LIST

1 fan motor
2, 12 fluid-dynamic bearing device
3 rotator
4 fan
5 drive portion
5*a* coil
5*b* magnet
6 base portion
7 housing
7*c* upper end surface
7*d* sealing surface
8 fluid-dynamic bearing
8*a* inner peripheral surface
8*a*1 dynamic pressure generating groove
8*a*2 inclined ridge portion
8*a*3 belt portion
8*b* upper end surface
8*b*1 dynamic pressure generating groove
8*c* lower end surface
8*d* outer peripheral surface
8*d*1 axial groove
9 hub portion
9*a* disc portion
9*a*1 lower end surface
9*b*, 9*c* cylindrical portion
9*d* flange portion
9*e* mounting hole
10 shaft portion
10*a* outer peripheral surface
10*b* lower end portion
10*c* lower end surface
11 thrust receiving portion
A1, A2 dynamic pressure generating groove array region
D1 inner diameter dimension
D2 outer diameter dimension
L axial dimension
R1, R2 radial bearing portion
S sealing space
T1, T2 thrust bearing portion

The invention claimed is:

1. A lubricating-oil composition for a fluid-dynamic bearing, the lubricating-oil composition being configured to be used for the fluid-dynamic bearing, which is formed of a porous body having inner pores, and comprises a radial dynamic pressure generating portion on an inner peripheral surface of the porous body, wherein a base oil having a kinematic viscosity of more than 30 $mm^2/s$ and 80 $mm^2/s$ or less at a temperature of 40° C. is used as a base oil, wherein the lubricating-oil composition has a kinematic viscosity of 90 $mm^2/s$ or more and 140 $mm^2/s$ or less at a temperature of −40° C., and 40° C., wherein a ratio of a viscosity index improver to the lubricating-oil composition is 4 wt % or less, wherein the base oil is a mixture of a non-polar oil and a polar oil, and a ratio of the non-polar oil to an entirety of the base oil is 20 wt % or more and 30 wt % or less, wherein the non-polar oil is a synthetic hydrocarbon oil made from poly-α-olefin or a hydride of poly-α-olefin, wherein the polar oil is an ester oil selected from the group consisting of monoesters, diesters, polyol esters, and complex esters, wherein the viscosity index improver is a polymethacrylate-based viscosity index improver, and wherein the lubricating-oil composition also includes an antioxidant and a rust inhibitor as components other than the base oil.

2. The lubricating-oil composition for a fluid-dynamic bearing according to claim 1, wherein the polar oil is a mixture oil of a diester and a polyol ester.

3. A fluid-dynamic bearing obtained through impregnation of the inner pores with a lubricating-oil composition of claim 1.

4. The fluid-dynamic bearing according to claim 3, wherein a dynamic pressure generating groove array region is formed as the radial dynamic pressure generating portion on the inner peripheral surface.

5. The fluid-dynamic bearing according to claim 3, wherein an inner diameter dimension is 2.0 mm or less, and an axial dimension is 3.5 mm or less.

6. A fluid-dynamic bearing device, comprising:

a fluid-dynamic bearing of claim 3;

a housing having an inner periphery to which the fluid-dynamic bearing is fixed;

a rotator having a shaft portion inserted along an inner periphery of the fluid-dynamic bearing; and a radial bearing portion configured to radially support the shaft portion in a non-contact manner through an oil film of the lubricating-oil composition, which is formed in a radial bearing gap between the inner peripheral surface of the fluid-dynamic bearing and an outer peripheral surface of the shaft portion.

7. The fluid-dynamic bearing device according to claim 6, wherein the shaft portion being rotatable with respect to the fluid-dynamic bearing in a non-contact manner has an eccentricity ratio of up to 98%.

8. A motor comprising a fluid-dynamic bearing device of claim 6.

* * * * *